July 20, 1965 E. I. VALYI 3,195,226
MANUFACTURE OF COMPOSITE BODIES UTILIZING LIQUID
SOLUBLE MATERIAL TO MAINTAIN POROSITY
Filed June 13, 1962

INVENTOR
EMERY I. VALYI
BY Henry Powers
ATTORNEY

United States Patent Office

3,195,226
Patented July 20, 1965

3,195,226
MANUFACTURE OF COMPOSITE BODIES UTILIZING LIQUID SOLUBLE MATERIAL TO MAINTAIN POROSITY
Emery I. Valyi, Riverdale, N.Y., assignor to Olin Mathieson Chemical Corporation, a corporation of Virginia
Filed June 13, 1962, Ser. No. 202,139
12 Claims. (Cl. 29—423)

This invention relates to metallic elements and more particularly to composites formed by integrating a sintered metal element to a base of solid sheet metal. The composites formed in accordance with the present invention are highly useful in a wide variety of applications, as disclosed in U.S. patent application S.N. 732,663, now U.S. Patent 3,049,795, of which this application is a continuation-in-part, for example, the composites may be used in gas burners, evaporative coolers, and filters.

Heretofore, composites formed from a sintered porous body and a solid metal backing sheet have been fabricated by depositing a mass of metal aggregate on a solid sheet metal element, and subjecting the assembly to elevated temperatures sufficient to sinter the metal particles to each other and to the backing sheet. Briefly, it has now been discovered that a more efficient bond of greater strength can be obtained between the porous body and the solid backing sheet by effecting the bond therebetween by means of conventional pressure welding techniques such as, for example, between mill rolls. Preservation and control of the interstices and porosity of the porous body is obtained by means of liquid soluble filler material infiltrated or otherwise deposited within the interstices of the porous body. This filler material comprises a substance flowable with the porous body under applied pressures permitting control of the porosity of the composite in direct relation with the size and quantity of the filler material employed. Subsequent to the welding operation this filler material is then readily removed by leaching with a suitable solvent therefore.

Accordingly, it is an object of this invention to provide a novel process for making a composite having a porous body metallurgically integrated to a solid sheet metal backing member.

It is a further object of this invention to provide a novel process for obtaining a metallurgical bond of greater efficiency and strength between a porous metal body and a solid sheet metal backing member.

Other objects and advantages of this invention will become more apparent from the following description and drawings, in which.

Figure 1:
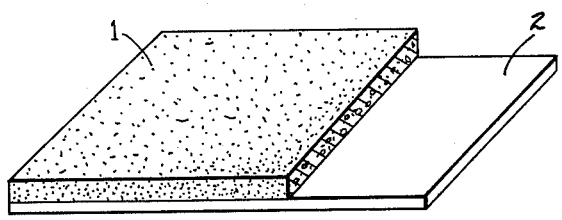
FIGURE 1 is a perspective view partly in section illustrating one embodiment of this invention.
Figure 2:
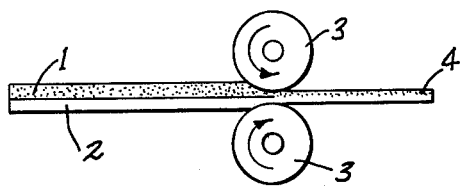
FIGURE 2 is an elevational view illustrating a subsequent procesing of the embodiment shown in FIGURE 1.

Referring to the drawings, FIGURE 1 shows a sheet-like porous body 1 superimposed on a solid sheet metal backing element 2 representing the components to be fabricated into the desired composite. The porous body 1 may comprise any metal aggregate conventionally produced by sintering processes, as for example, aluminum, copper, nickle and alloys thereof, stainless steels, various ferrous alloys and other like materials. For purposes of this invention the porous body may comprise a mass of metal particles suitably sintered into the desired form, or the porous body may comprise a metal aggregate compressed into sufficient rigidity for subsequent manipulation in the procesing required therefor. However, in accordance with this invention the interstices of the porous body are infiltrated with or have suitably deposited therein a filler material capable of flowing with the porous body under applied pressures encountered in various pressure welding techniques or operations. Various liquid soluble materials may be employed herein, for example, the filler material may comprise sodium chloride or anhydrous trisodium phosphate or other like material capable of flowing with the porous body during the subsequent welding operations.

Various methods may be utilized in disposing the filler material in the interstices of the porous body, for example, metal particles weldable to the solid backing member component 2 may be mixed with particulate filler material of the size corresponding to the porosity desired in the ultimate structure. Thereafter, the mixture of metal aggregate and filler material may be compacted by compression and the like, to a rigidity permitting manipulation during subsequent processing, or the compacted mixture may be subjected to elevated temperatures sufficient to sinter the metal particles to each other thus forming an impermeable structure comprised, in substance, of a porous body having its interstices infiltrated with the filler material. In an alternate manner, with reference to aluminum aggregate containing filler material comprised of sodium chloride, the filler material may be provided by direct deposition from solution. This alternate method takes advantage of the differences in solubility of the filler material at different temperatures, for example, sodium chloride has a solubility of 36 grams per 100 cc. of water at 20° C. and/or 39.8 grams per 100 cc. of water at 100° C. In practice, in accordance with this method, a solution of the sodium chloride filler material is formed at a high temperature, as for example 100° C., and the aluminum aggregate permeated with the solution. During the course in cooling of this solution in contact with the metal aggregate, the solubility of sodium chloride will decrease, and the salt as a result will precipitate upon the metal aggregate. Thus, for example, with sodium chloride, 3.8 grams of this filler material becomes available to precipitate for every 100 cc. of the solvent. Anhydrous trisodium phosphate may also be formed as a filler material in like manner and is particularly preferred for application with metal aggregates that require substantially higher sintering and/or hot rolling temperatures, as for example, copper. For purposes of illustrating utilizations of anhydrous trisodium phosphate, it is noted that since it has a solubility of 108 grams per 100 cc. of water at 100° C. and 11 grams per 100 cc. of water at ambient temperatures (20° C.), cooling of the solution precipitates 97 grams of the salt per 100 cc. of solution which becomes available for precipitation on the metal aggregate. In the foregoing methods of depositing filler material upon metal aggregate from solution, the excess solution is disposed of and the resultant composite of aggregate and filler material may then be dried and bonded to a backing sheet under pressure.

After superimposition of the porous body 1 on the solid sheet metal backing member 2 as shown in FIGURE 1, the assembly may then be secured against separation in any suitable fashion, as for example by spot-welding at the corners thereof, and then suitably pressure welded together at their adjacent faces. One well-known method for welding the elements together is by conventional hot rolling techniques in which the elements of the assembly are first heated and passed between mill rolls 3, see FIG- URE 2, between which they are reduced in thickness and elongated in the direction of rolling to form the composite 4. Thereafter the composite is then soaked in the solvent of the filler material for sufficient time to leach it from the interstices of the porous component of the composite.

Specifically in reference to the foregoing, in one example, 1100 aluminum alloy aggregate of −35+60 mesh was admixed with approximately 30% by weight of −35+100 mesh sodium chloride, the mixture was suitably compacted at a pressure of 5 tons per square inch at room temperature into a 0.125 inch thick sheet. Thereafter, this sheet-like body was superimposed on a 0.125 inch thick sheet of 1100 aluminum alloy, the assembly pressure welded at a 65% reduction at a temperature of 950° Fahrenheit between a pair of mill rolls; only one pass was required. The pressure welded assembly was then soaked in a bath of hot tap water until essentially all the sodium chloride was dissolved from the interstices contained within the porous body of the resultant composite, the time for complete removal of course being dependent upon the precise configurations of the voids in the metal aggregate.

Figure 3:
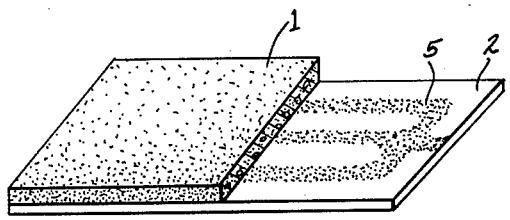
FIGURE 3 is a perspective view partly in section illustrating another embodiment of this invention.

FIGURE 3 depicts a modification of this invention, wherein the porous sheet component 1 and the solid sheet metal backing member 2 may have interposed between them a pattern of stop-weld material 5 applied in a design corresponding to a desired system of fluid channels. Upon assembly, the components 1 and 2 are pressure welded together, as with the preceding embodiment, between a pair of mill rolls in the areas between the components not separated by the stop-weld material. Although any suitable weld-inhibiting material may be employed to prevent unification in the areas between the components coated therewith, the aforedescribed sodium chloride and anhydrous trisodium phosphate may also be utilized with advantage in this modification. For use of these salts a paste thereof may be prepared of suitable consistency to permit its coating on backing member 2 in the pattern desired.

Figure 4:
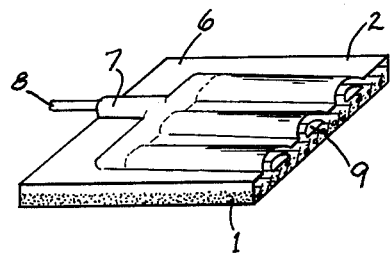
FIGURE 4 is a sectional view in perspective illustrating a subsequent processing step of the embodiment shown in FIGURE 3.
Figure 5:
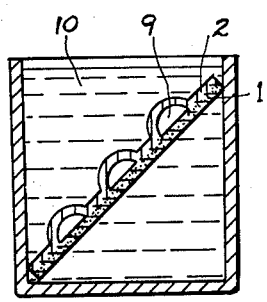
FIGURE 5 is an elevational view in cross-section illustrating an additional processing step of the embodiment shown in FIGURE 3.

After the welding operation, the resultant composite 6, as best seen in FIGURE 4, has a nozzle receiving strip 7 forced open, a nozzle 8 is then inserted into the resultant orifice and the resultant structure is distended by injecting into the unwelded areas between the components defined by the pattern of stop-weld material a fluid under sufficient pressure to form the desired fluid channels 9. The fluid pressure is injected at a rate insufficient to destroy the impermeable barrier formed by the presence of the filler material within the interstices of the porous component, thus permitting the distention of the solid component, in the composite, opposite the stop-weld material, into a system of fluid channels 9 of desired configuration. The expansion of the composite may be accomplished by any conventional method, as for example, the composite may be expanded after being clamped between dies recessed in portions conforming to the configuration of the unwelded areas of the composite, or between spaced-apart flat platens. If the composite is expanded between dies, the resultant fluid channels may be given any desired configuration. Further, the composite may also be expanded without restraint in which case the fluid channels 9 will be of rounded configuration. As with the preceding embodiment, after distention the resultant composite may then be soaked by immersion in a solvent 10.

Although the invention has been described with reference to specific embodiments, materials and details, various modifications and changes within the scope of this invention will be apparent to one skilled in the art and are contemplated to be embraced within the invention.

What is claimed is:

1. A method of making a composite structure comprising, forming a sinterable, flat, sheet-like body of an aggregate of solid metal particles having interstices between said particles, said interstices being filled with a liquid-soluble filler material flowable with said body under pressure, forming an assembly by superimposing said body on a solid flat sheet of metal, rolling said assembly under pressure between a pair of mill rolls at a temperature and reduction sufficient to cause the metal aggregate of said body to weld together and to said sheet to thereby form said composite, and leaching said filler material from said composite with said liquid.

2. The method of claim 1 wherein said filler material comprises a substance selected from the group consisting of sodium chloride and anhydrous trisodium phosphate, and said liquid is water.

3. A method of making a composite structure comprising, forming a compressed, flat, sheet-like body of an aggregate of solid metal particles having interstices between said particles, filling said interstices with a liquid-soluble filler material flowable with said body under pressure, said body being sufficiently rigid for manipulation thereof, forming an assembly by superimposing said body on a solid flat sheet of metal, rolling said assembly under pressure between a pair of mill rolls at a temperature and reduction sufficient to cause the metal aggregate of said body to weld together and to said sheet to thereby form said composite, and leaching said filler material from said composite with said liquid.

4. The method of claim 3 wherein said filler material comprises a substance selected from the group consisting of sodium chloride and anhydrous trisodium phosphate, and said liquid is water.

5. A method of making a composite structure comprising, forming a sinterable, flat, sheet-like body of an aggregate of said metal particles having interstices between said particles, said interstices being filled with a liquid-soluble filler material flowable with said body under pressure, forming an assembly by superimposing said body on a solid flat sheet of metal, rolling said assembly under pressure between a pair of mill rolls at a temperature and reduction sufficient to cause said body to weld to said sheet to thereby form said composite, and leaching said filler material from said composite with said liquid.

6. The method of claim 5 wherein said filler material comprises a material selected from the group consisting of sodium chloride and anhydrous trisodium phosphate, and said liquid is water.

7. A method of making a composite structure comprising, forming a sinterable, flat, sheet-like body of an aggregate of solid metal particles having interstices between said particles, said interstices being filled with a liquid-soluble filler material flowable with said body under pressure, with said filler forming a fluid impervious barrier in said body, forming an assembly by superimposing said body on a solid flat sheet of metal with a pattern of stop-weld material interposed therebetween in a design corresponding to a desired system of fluid channels, rolling said assembly under pressure between a pair of mill rolls at a temperature and reduction sufficient to cause the metal aggregate of said body to weld together and to said sheet in the areas therebetween not separated by said stop-weld material to thereby form said composite, injecting into the unwelded areas between said body and said sheet defined by said stop-weld material a fluid under sufficient pressure to distend said sheet in the portions thereof opposite said stop-weld material into said system of fluid channels with said fluid being injected at a rate insufficient to destroy said barrier, and leaching said filler material from said composite with said liquid.

8. The method of claim 7 wherein said filler material comprises a substance selected from the group consisting of sodium chloride and anhydrous trisodium phosphate, and said liquid is water.

9. A method of making a composite structure comprising, forming a compressed, flat, sheet-like body of an aggregate of solid metal particles having interstices between said particles, filling said interstices with a liquid-soluble filler material flowable with said body under pressure with said filler forming a fluid impervious barrier in said body, said body being sufficiently rigid for manipulation thereof, forming an assembly by superimposing said body on a solid flat sheet of metal with a pattern of stop-weld material interposed therebetween in a design corresponding to a desired system of fluid channels, rolling said assembly under pressure between a pair of mill rolls at a temperature and reduction sufficient to cause the metal aggregate of said body to weld together and to said sheet in the areas therebetween not separated by said stop-weld material, to thereby form said composite, injecting into the unwelded areas between said body and said sheet defined by said stop-weld material a fluid under sufficient pressure to distend said sheet in the portions thereof opposite said stop-weld material into said system of fluid channels with said fluid being injected at a rate insufficient to destroy said barrier, and leaching said filler material from said composite with said liquid.

10. The method of claim 9 wherein said filler material comprises a substance selected from the group consisting of sodium chloride and anhydrous trisodium phosphate, and said liquid is water.

11. A method of making a composite structure comprising, forming a sinterable, flat, sheet-like body of an aggregate of solid metal particles having interstices between said particles, said interstices being filled with a liquid-soluble filler material flowable with said body under pressure with said filler forming a fluid impervious barrier in said body, forming an assembly by superimposing said body on a solid flat sheet of metal with a pattern of stop-weld material interposed therebetween in a design corresponding to a desired system of fluid channels, rolling said assembly under pressure between a pair of mill rolls at a temperature and reduction sufficient to cause said body to weld to said sheet in the areas therebetween not separated by said stop-weld material to thereby form said composite, injecting into the unwelded areas between said body and said sheet defined by said stop-weld material a fluid under sufficient pressure to distend said sheet in the portions thereof opposite said stop-weld material into said system of fluid channels with said fluid being injected at a rate insufficient to destroy said barrier, and leaching said filler material from said composite with said liquid.

12. The method of claim 11 wherein said filler material comprises a material selected from the group consisting of sodium chloride and anhydrous trisodium phosphate, and said liquid is water.

References Cited by the Examiner

UNITED STATES PATENTS

| 2,350,179 | 5/44 | Marvin. | |
| 2,663,928 | 12/53 | Wheeler, Jr. | |
| 2,690,002 | 9/54 | Grenell | 29—421 X |
| 2,957,235 | 10/60 | Steinberg | 29—424 |
| 3,135,044 | 6/64 | Mote, Jr. et al. | 29—423 |
| 3,138,856 | 6/64 | Kuchek | 75—20 X |
| 3,138,857 | 6/64 | Kuchek | 75—20 X |

FOREIGN PATENTS 793,364   4/58   Great Britain.

OTHER REFERENCES

Polonsky et al.: Lightweight Cellular Metal Transactions of American Foundryman's Society, vol. 69 (1961), pp. 65–79 (Foam Digest), literature.

Campbell, J. B.: Porous Metal Sheet; Materials and Methods, April 1955.

JOHN F. CAMPBELL, *Primary Examiner.*

WHITMORE A. WILTZ, *Examiner.*